United States Patent
Miguel

(10) Patent No.: US 6,995,863 B1
(45) Date of Patent: Feb. 7, 2006

(54) DISCRETIONARY DOTTING FOR ARTIFACT CONTROL IN INCREMENTAL PRINTING

(75) Inventor: Antoni Gil Miguel, Sabadell Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 856 days.

(21) Appl. No.: 09/642,417

(22) Filed: Aug. 19, 2000

(51) Int. Cl.
*G06F 15/00* (2006.01)
*G06F 13/00* (2006.01)

(52) U.S. Cl. .................................... 358/1.9; 358/1.8
(58) Field of Classification Search ............ 358/1.9, 358/518, 534, 538, 533, 1.8; 382/167, 162
See application file for complete search history.

(56) References Cited

U.S. PATENT DOCUMENTS

| | | | | |
|---|---|---|---|---|
| 4,963,882 A | * | 10/1990 | Hickman | 347/41 |
| 5,473,446 A | | 12/1995 | Perumal, Jr. et al. | 358/523 |
| 5,778,160 A | * | 7/1998 | Smith | 358/1.9 |
| 5,991,511 A | * | 11/1999 | Granger | 358/1.9 |
| 6,082,849 A | * | 7/2000 | Chang et al. | 347/43 |
| 6,363,172 B1 | * | 3/2002 | Cheung et al. | 382/167 |
| 6,441,922 B1 | * | 8/2002 | Askeland et al. | 358/1.9 |
| 6,483,606 B1 | * | 11/2002 | Klassen et al. | 358/1.9 |
| 6,542,258 B1 | * | 4/2003 | Garcia et al. | 358/1.9 |
| 6,690,485 B1 | * | 2/2004 | Borrell et al. | 358/1.9 |
| 6,721,063 B1 | * | 4/2004 | Harrington | 358/1.9 |
| 2001/0012109 A1 | * | 8/2001 | Magee | 358/1.9 |

* cited by examiner

Primary Examiner—Madeleine Nguyen
(74) Attorney, Agent, or Firm—Peter I. Lippman

(57) ABSTRACT

Apparatus and method reduce banding by addressing an image region at under 100% coverage, and adding colorant quanta to selected pixels already receiving that colorant. The amount of that colorant in some pixels is zero, in others a first nonzero number of quanta, in still others a second nonzero number—different from the first. In another aspect, the invention is a method of adding colorant in a region to which colorant is already addressed; it eliminates or reduces white- or light-line banding by automatically establishing a ratio, below half, of number of added-colorant pixels to total number of addressed pixels.

26 Claims, 7 Drawing Sheets

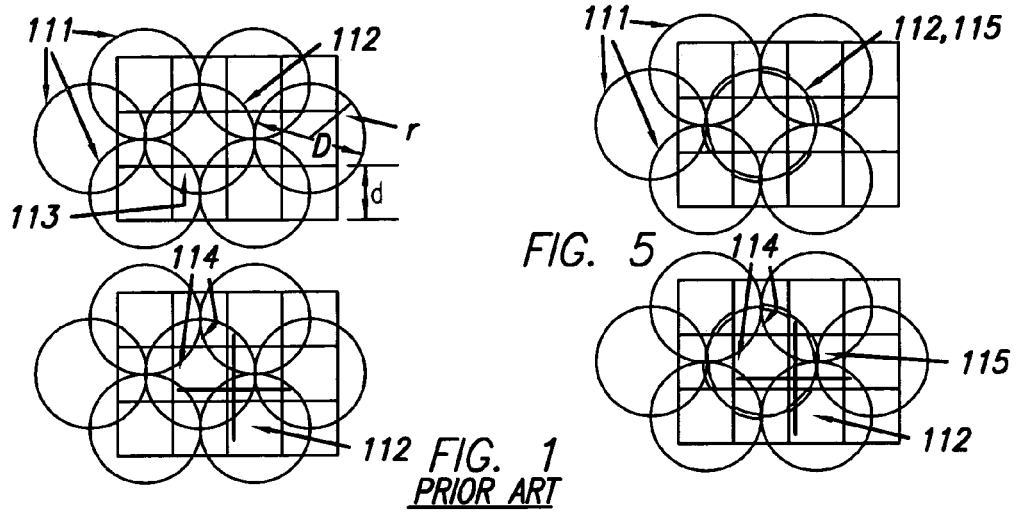
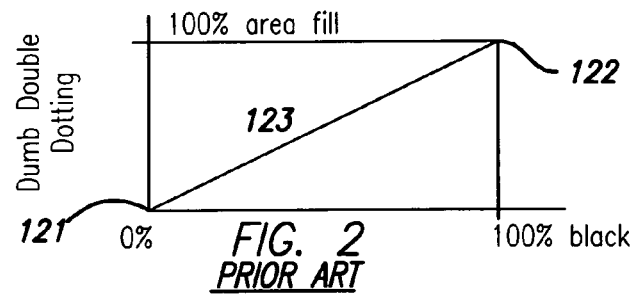
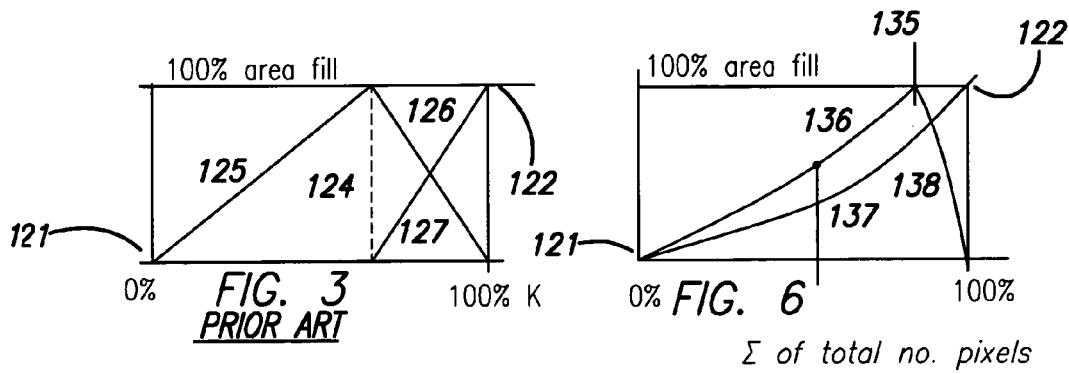
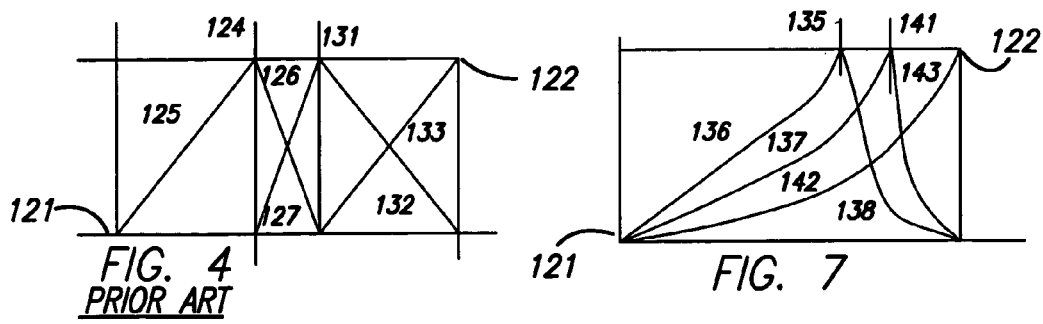

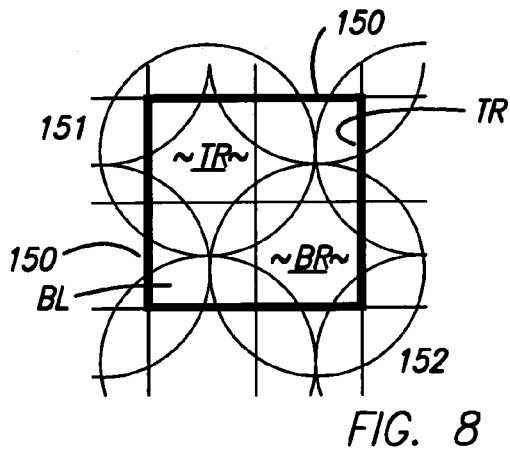
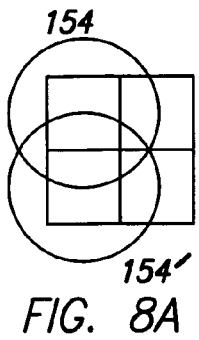
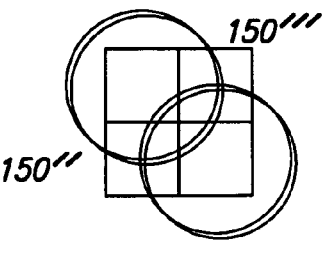
FIG. 8   FIG. 8A   FIG. 8B
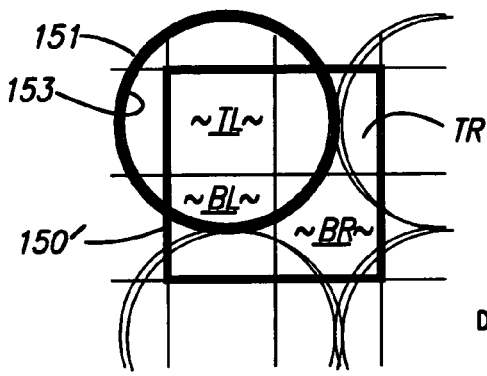
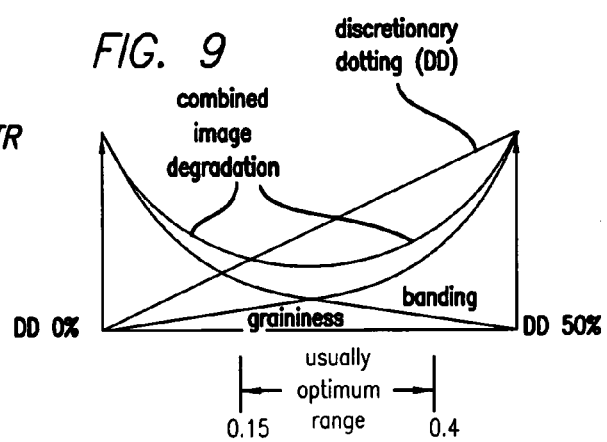
FIG. 9
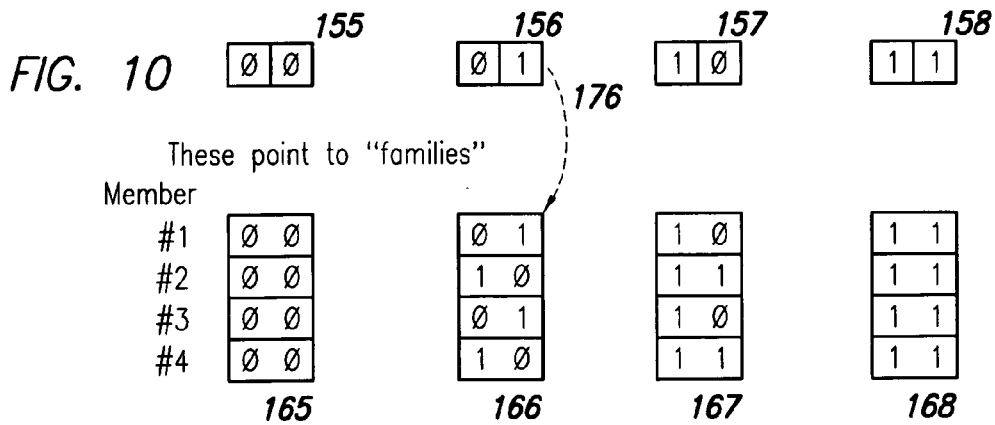
FIG. 10

DISCRETIONARY DOTTING FOR ARTIFACT CONTROL IN INCREMENTAL PRINTING

RELATED PATENT DOCUMENTS

Closely related documents are other, coowned U.S. utility-patent applications filed in the United States Patent and Trademark Office generally contemporaneously with this document—and also hereby incorporated by reference in their entirety into this document. One is in the names of Lain et al., and entitled "RANDOMIZED SUPERPIXELS TO ENHANCE MULTILEVEL IMAGE QUALITY IN ECONOMICAL, FAST INCREMENTAL-PRINTING ERROR DIFFUSION"—and subsequently assigned utility-patent application Ser. No. 09/642,416. Lain is of interest for general context but especially the implementation of random selection of specific dots to be discretionarily augmented. Another such document is in the names of Garcia-Reyero et al., and entitled "IMPROVEMENTS IN AUTOMATED AND SEMIAUTOMATED PRINTMASK GENERATION FOR INCREMENTAL PRINTING"—and subsequently assigned utility-patent application Ser. No. 09/632,197, and issued as U.S. Pat. No. 6,443,556. The Garcia-Reyero document and others cited in it are particularly pertinent as to masking strategies implemented through a family of program techniques dubbed "Shakes", especially including downweighting of print elements (e.g. nozzles) that are weak or misaimed; these strategies assume that such elements have been or will be identified. A third related document is in the names of Cluet et al., and identified and entitled "PRINTING AND MEASURING DIRECTLY DISPLAYED IMAGE QUALITY, WITH AUTOMATIC COMPENSATION, IN INCREMENTAL PRINTING"—and subsequently assigned utility-patent application Ser. No. 09/642,418. Cluet teaches how to find bad nozzle groups, to facilitate compensating in weights as by the Garcia-Reyero documents. Also of interest is U.S. utility-patent application Ser. No. 09/252,163, later issued as U.S. Pat. No. 6,690,485, of Borrell—a coworker of the present inventor—who adds or "proplets" inking to linearize saturation. More remote but of interest are depletion techniques generally, and particularly work on reverse undercolor adjustments e.g. in U.S. Pat. No. 5,473,446 of Perumal.

FIELD OF THE INVENTION

This invention relates generally to devices and procedures for printing text or graphics on printing media such as paper, transparency stock, or other glossy media; and more particularly to a scanning thermal-inkjet machine and method that construct text or images from individual ink spots created on a printing medium, in a two-dimensional pixel array. The invention is applicable to various kinds of printing devices including facsimile machines and copiers as well as printers. The invention employs printmode techniques to conceal printing artifacts, particularly including certain forms of banding.

BACKGROUND OF THE INVENTION (a) The banding problem—White or light striations along the scan axis, often called "banding", have been a commonly noted problem since the earliest days of incremental printing by inkjet and like printing devices, and ironically have yet to be fully resolved. A primary reason for the seeming stubbornness of these artifacts is that several different kinds and causes of banding occur, so that no single insight or cure can be possible.

Many banding types are now under much better control than originally. At the same time, however, new solutions for various banding problems continue to be needed because of rising quality standards and increasingly difficult operating conditions—due e.g. to marketplace demands for high throughput.

The present invention is directed mainly to banding that is caused by dot-placement error (DPE)—in other words, errors produced by printing elements (inkjet nozzles etc.) that are not aimed correctly. It also helps conceal banding due to elements that are not working at all or are weak, as for example inkjet nozzles that are plugged or whose firing heaters are not of the correct resistance.

In all such cases, rows of the image pixel grid that should be printed at some nominal saturation level are instead printed either lightly or not at all, and this is perceived as a white or light line across the image. Such lines may appear singly or in clusters—since the print-element failures that produce them often occur in groups.

(b) The search for a robust solution—In this field the term "robust" means resistant to varied severity of the problem and to a variety of operating conditions, including some conditions that may be unexpected. The act of aiming one single dot into a regular grid is actually the least robust method, as far as banding is concerned.

Such operation does display a good degree of peak image quality. The chance of achieving this optimum performance, however, is small due to the loose tolerances of economical printing systems (i.e. printing elements and positioning mechanisms).

A classical approach to mitigation of banding is multipass printing—and this technique is generally accepted since multipass printing also helps resolve several other important problems, though it does degrade throughput. Such printing divides each swath of an image into contributions made during several scans of the print-element array (e.g. pen) across the image.

This type of printing also advances the print medium, between scans or groups of scans, by some fraction of the array length. Each advance brings a different printing element (e.g. nozzle) of the array into alignment with a particular pixel row on the medium.

The idea is that any artifact due to a particular print element in an array—at some given row on a printing medium—tends to be buried and thus concealed in the contributions made by other elements of the same array. Classically, however, unfortunately each other element has its own job to do, so that actually light or white streaks due to impairment of one printing element remain discernible even though superposed upon patterns of colorant dots contributed by other elements.

In the past it has been supposed that multipass printing itself would suffice to adequately conceal banding of the light-line or white-line type. The error in such suppositions is due in part to escalating marketplace standards of quality—but also arises in large part from the evolving character of print-element malfunction.

Early incremental-printing systems, and particularly the printing-element arrays (nozzle plates etc.) were essentially machine tooled, and short, and rather precisely constructed—particularly as to aiming. Unfortunately these were both slow in printing (because of their shortness) and expensive. Progressively longer inkjet printing arrays have been made economically possible by the advent of tape-automated bonding ("TAB") techniques with laser perforation, but only at the cost of considerable imprecision in dot placement (sometimes characterized as "directionality").

Performance of TAB-fabricated printheads has now improved markedly. Nevertheless the capability of printing-element arrays to misdirect colorant continues to outstrip the capability of multipass printing to hide such phenomena. This is an example of the importance of robustness in solutions to the banding problem.

On the other hand, users may no longer be willing to wait quite as contentedly while a printer produces excellent image quality through painstaking six- or ten-pass print-modes. This is an example of the influence of escalating marketplace standards.

(c) Printmode techniques—Modern multipass printing has evolved greatly, with highly sophisticated strategies ("printmasking") to allocate colorant deposition as among passes. These strategies include pseudorandom allocation, intended mainly to reduce patterning artifacts that come from repetitive interaction of cyclical mechanism errors with dither masks (rendition threshold matrices)—or even with repeating phenomena inherent in the more-elementary allocation strategies themselves. Sometimes these patterning artifacts, too, are called "banding" but for purposes of the present document that nomenclature is only confusing. What is of interest here is light- or white-line banding.

These strategies do incidentally help to swamp out the effects of any individual element malfunction in a complex of patterns, both intended and otherwise, generated by other elements. These methodologies are meritorious and serve their purpose well; overall, however, the correction of white- and light-line banding is not the main function of printmasking; and such banding persists.

Another very modern printmasking development is the use of print-element usage weighting, and complementary replacement regimens, in attempts to eliminate image-quality degradation due to known malfunctioning elements. The previously mentioned document of Garcia-Reyero, and other references cited in that document, introduce a great body of such technique.

All such efforts, however, require some sort of testing to identify malfunctioning elements; one such approach is presented in the above-mentioned document of Cluet. Techniques that require testing are somewhat disfavored in that they implicate operational delays and additional expensive apparatus—as well as costs for colorant (and sometimes printing medium) consumed in the tests.

Hence it remains desirable to find ways to eliminate or at least greatly reduce the appearance of light- or white-line banding without testing the printing elements. A robust solution must be one that deals effectively with dot-placement error that occurs in a variety of forms and intensities.

(d) Etiology of banding—The foregoing discussions point to an important need for deeper understanding of the detailed causes of white/light-line banding—and in particular its sensitivity to both the character and severity of dot-placement error. The present inventor has considered and experimented in this area very extensively, and along the way to the present invention has developed important insights into these facets of the banding problem.

These insights thus are no part of the related art but rather are regarded as part of the creative processes underlying the present invention. Accordingly they will be reserved for the following sections of this document that relate to the invention.

(e) Use of two or more drops—For the present section it may be noted how the prior art has applied more than one quantum of colorant (e.g. inkdrop) to a printing medium. These observations will be presented in a conceptual framework that will be useful for later discussions.

One relatively primitive technique is to use two quanta wherever any colorant is to be applied. In other words—on a scale from zero 121 (FIG. 2) to full saturation 122 (for instance solid black)—when the first step is taken away from zero inking 121 in highlight regions, it is taken by printing not one but two inkdrops in some pixel.

At the other end 122 of the scale when the last step is taken to achieve fullest available saturation, it is taken by adding not just one more last drop in some pixel but rather two. The continuum between these extreme points is followed in exactly the same way, defining a linear gradation 123 (FIG. 2) with two inkdrops (or other fixed count of quanta, depending on the writing system) added at each increment. When those last two drops have been added, then either zero or two dots have been placed into each pixel in the grid—or, for a system that does not use every pixel, into each pixel that is to be addressed at all.

(This full-usage pixel-count condition represents "full coverage" or "100% coverage" for the particular writing system. For purposes of this document, the working definition of "full coverage" or "100% coverage" is thus not a matter of calculating inked area. Rather it is a matter of counting colorant quanta, e.g. dots, per pixel—for comparison with the total number of quanta per pixel employed or permitted.)

The objectives of such double-dot-always operation may include obtaining, at each point along the scale, better calorimetric saturation than available with singledrop increments—and may also include providing finer drops and thereby better liquid control. This technique is sometimes called "dumb double dotting".

As to banding, for reasons that will later become clear, dumb double dotting is slightly more robust than single-drop printing. Accompanying granularity, however, is very high. Moreover this type of printing is not compatible with some printing media—and fails to completely resolve the banding problem.

Conventional orderly multilevel printing proceeds by a different sequence. In addition to the highlight end 121 (FIG. 3) and shadow end 122 of the scale, here there is an additional, intermediate breakpoint 124 which represents the greatest saturation attainable with single dotting. Because the later and higher-dot-count condition 122 exists, however, breakpoint 124 is not "full coverage" or "100% coverage".

In developing progressive fractions of area fill, this system first assigns one individual drop for placement in each one of a progressively rising number of pixels—following a linear relation 125 (FIG. 3) to the breakpoint 124. This linear curve represents the number of pixels holding one dot.

At the breakpoint 124 one dot is placed in each pixel—or, again, in each pixel that is to be addressed at all. As suggested above, although this pixel count may yield maximum single-dot saturation or perhaps even "full single-dot coverage", for purposes of this document it will not be identified as "full coverage" or "100% coverage".

Thereafter for continuing higher fractions of area fill it is necessary to begin to add another dot to some pixels. The number 126 of pixels holding one dot thus declines while the difference is taken up by a complementary linear curve 127, representing the number of pixels holding two dots.

The latter line ascends to the above-identified fullsaturation, "full coverage" or "100% coverage" point 122. In this region between the breakpoint 124 and the shadow or full-saturation end 122 of the scale, the total number of inked pixels is a sum of single-dot pixels 126 and double-dot pixels 127.

The possibility remains, however, that some pixels are entirely unused. As will shortly be seen, for instance, some systems use only every other pixel; such pixel structure has been used particularly in conjunction with oversize dots, relative to the grid pitch.

Still within the prior art, conventional orderly multilevel printing is capable of managing still larger numbers of dots per pixel. This is accomplished by extension of the same regimen just described.

More specifically, the system first adds not one breakpoint 124—having the same significance described above—but also a second intermediate breakpoint 131 (FIG. 4) related to the greatest saturation available with double dotting; the system then connects the several critical states linearly as before. Thus the first ascending segment 125 is still the growing number of pixels holding one dot; and the second, falling segment is the decline of such pixels as the number 127 of pixels holding two dots rises.

When that latter curve 127, however, now reaches full coverage by two dots per pixel—or per pixel that is to receive any dots at all—the saturation has now only reached the second breakpoint 131. Here, analogously, the number of two-dot pixels declines 132 (FIG. 4) while a new regime 133 namely the number of three-dot pixels completes the rise to full three-dot coverage 122.

In this region the total number of pixels is the sum of double-dot pixels 132 and triple-dot pixels 133. At the 100%-coverage point 122, three dots reside in every pixel—or, here again, at least every pixel that is ever to receive any dots.

The multilevel "orderly" methods have potential for improvement relative to binary printing, because a single drop can be smaller than before. Therefore these methodologies can improve granularity relative to binary printing—but no improvement is obtained in the initial banding behavior, in the region from zero area fill 121 to the point 124 where each pixel is occupied by one drop. Unfortunately it is in the upper ends of these ranges, i. e. the middle tones, where banding is most conspicuous to the eye.

There is another noteworthy variant of a "checkerboard" system—i. e., a rectangular pixel grid in which the only pixels used are those in a checkerboard pattern. Those of ordinary skill in this field will appreciate that such a system in principle can be made to use, say, the alternate checkerboard positions for the third dot set 133 or the second dot set 127, or both.

In such a case, dots in the third or second set are centered between, not on, dots in the first set 125. It will also be clear that for patent purposes this is merely an equivalent of a basic checkerboard system in which all three sets share the same pixels.

(f) Conclusion—Obstinate problems of white-line and light-line banding thus continue to impede achievement of uniformly excellent inkjet printing—at high throughput—on all industrially important printing media. Thus important aspects of the technology used in the field of the invention remain amenable to useful refinement.

SUMMARY OF THE DISCLOSURE

The present invention introduces such refinement. Before providing any relatively rigorous discussion or definition of the invention, this document will first offer an informal introduction to the previously mentioned insights that underlie the invention.

It will be understood, however, that the merit of the invention stands on its own. That is, the effectiveness and validity of the invention do not depend upon the accuracy or incisiveness of the philosophy presented here.

The insights discussed here concern the relationship between the character or severity of (1) DPE and (2) resulting light/white-line banding. These discussions and analyses proceed from simple geometrical observations, which are made possible by focusing upon the printing of a monochrome area fill—as a simplified model of the environment of the problem.

Some analyses go further, considering most particularly the printing of a nominally solid area fill. Again, from the later detailed description it will be seen very clearly that the invention is not limited to solid fills, but very much to the contrary applies particularly to mid-tone and even highlight levels.

The problem and its solution by the present invention are thus far more general than these models may suggest. Nevertheless they are useful models for discussion, and it is important only to later return to the recognition that there are other colors in the system as well, and that they too are subject to the techniques of the invention.

In an ideal prior-art pixel grid, a uniform monochrome solid area fill has a large multiplicity of circular dots 111, 112 (FIG. 1, top view). In this particular diagram, each dot is assumed to be of diameter D twice the grid pitch d and also with perfect spacing s on centers at twice the grid pitch along each row or column. In alternate rows and columns, however, the dot centers are displaced so that each dot is centered, checkerboard fashion, on a white area left uninked by its diagonal neighbors.

As the drawing shows, the entire image area is filled with at least one layer of ink—and from simple geometrical calculation, subareas 113 roughly aggregating 0.57 of the total area are covered by two layers. Since more than half the grid is double-inked it might be supposed that such a geometry is very robust in resistance to dot placement error.

Surprisingly, however, this is not so—as seen by the entirely uninked space 114 that appears if just one dot 112 (FIG. 1, lower view) is misplaced rightward and downward by only about three-fifths of the grid pitch. (This represents a relatively severe degree of DPE.) In this lower view the newly assumed position of dot 112 is flagged by a vertical and horizontal crosshair pattern, now clearly off-center.

The result of such placement error is to destabilize the average lightness (measured for instance as $L^*$) or in other words to display white- or light-line banding. One helpful way to think about the situation is this:

(1) coverage is initially full on a dot-count basis because all pixels that are to be addressed have been addressed (even though this is only half the total number of pixels);

(2) nominally, coverage is initially complete on an areal-inking basis too, as there is nominally no white space showing: the circular dots all neatly and perfectly touch horizontal and vertical neighbors in four-point coincidences—i.e. point contacts—and (3) therefore, if any of the dots is displaced slightly, coverage can only go down.

The situation can worsen rapidly if any of the other dots above and to the left also happens to be misplaced away (not shown) from the one that is moving down and to the right.

Suppose, however, that at the correct position of the dot 112 which happens to be incorrectly placed, there is a directly superimposed second dot 115 (FIG. 5 upper view, shown in the dashed line). If the placement of the first dot 112 remains accurate, the second dot 115 may in effect be hidden on top of (or below) the first dot 112, and may not even be noticed.

When the unknown effects of dot placement error put the first dot 112 elsewhere, as shown in the lower view of FIG. 5 (still flagged as in FIG. 1 by the diametral crosshairs), then the extra dot 115 may seem to come out of nowhere to cover the space 114 that would otherwise be blank. As the drawing accurately suggests, the overall result may appear more grainy—but the average lightness is more constant.

A more pragmatic way of expressing the same thing is that the light and white lines identified as "banding" may be suppressed, either partially or entirely. These consequences have been validated through physical testing.

It will be understood that the beneficial results indicated in the simple diagrams are subject to statistical fluctuation. If the space 114 uncovered by DPE does not happen to be coincide with the extra dot 115, then the result for that particular space 114 may be extra granularity with no $L^*$ stabilization.

In general, however, this topic is merely a matter of sensitivity and optimization: a representative uncovered space 114 is generally far smaller than a typical dot 112 or 115. Hence the likelihood of a backup dot 115 catching and correcting uncovered space 114 is quite high, even for a dot-count fraction of just one dot in a field of seven as illustrated.

This is also true even on an areal basis, that is for relatively small fractions of backup-dot area 115 compared with the overall area inked (i.e. the aggregate area of all the dots illustrated). The detailed discussion which follows this summary section will teach some principles for selecting both the dot-count fraction and the placement of the backup dots.

In this document these backup dots 115 will sometimes be called "discretionary dots"; and the technique, "discretionary dotting" (DD). The dot-count fraction (e.g., one in a field of seven) mentioned just above is thus the "DD fraction" or "DD ratio".

To simplify discussion, and without any implication as to difference in character of individual markings, all the other dots—i.e. the original or prior-art dots 111, 112—will be called the "conventional" dots. In general, discretionary dots 115 and conventional dots 112 are identical—although it is within the scope of the invention to make them different if desired.

It may be noted that DD, being statistical, never requires any knowledge of the specific location for a dot 112 that is actually misplaced—or of the specific printing element (nozzle) whose incorrect functioning causes that misplacement.

Now with these insights in mind, discussion here will turn to a somewhat more rigorous discussion of the invention. In its preferred embodiments, the present invention has several aspects or facets that can be used independently, although they are preferably employed together to optimize their benefits.

In preferred embodiments of a first of its facets or aspects, the invention is apparatus for incremental printing of an image. The apparatus include some means for addressing a region of the image at less than full (100%) coverage (on a pixel-count basis as defined above). For purposes of generality and breadth in discussing the invention, these means will be called simply the "partial-coverage means".

The apparatus also includes some means for adding further colorant quanta to selected pixels already receiving that colorant as part of the less-than-full coverage within the region. These latter means, again for breadth and generality, will be called the "adding means".

The phrase "that colorant" here (or "said colorant" in certain of the appended claims) calls attention to the point that the colorant is of the same basic color—although possibly a different dilution. In other words, this first main facet of the invention relates to adding more of a particular color of ink.

Throughout this document including most of the appended claims, except where otherwise specified or clear from the context, it is to be understood that what is being discussed is a treatment that is applicable—and preferably is actually applied—to each color or dilution. Repeatedly reminding the reader of this understanding would be needlessly cumbersome, and distracting as well.

Based on cooperation of the partial-coverage means and the adding means, the amount of colorant printed in some pixels within the region is zero, in others is a first nonzero number of colorant quanta, and in still others is a second nonzero number of colorant quanta. The first and second nonzero numbers are different.

Otherwise the maximum values of the two nonzero numbers are each limited only by the "full coverage" quantum-per-pixel counts. Thus each of the nonzero numbers may be one, or less than or greater than one—depending primarily upon the size of the dot formed in the image by a colorant quantum.

For example if the dot is generally circular and its diameter is twice the height or width of a single pixel in the grid, then nominally complete areal inking (nominal elimination of white space, assuming no DPE) is usually attained by placing one quantum at every other pixel, checkerboard-fashion. System design will typically therefore establish this condition, one-half quantum per pixel on-average, as "full coverage". (This can instead be expressed, however, as one quantum per addressed pixel, i.e. one quantum per pixel that is ever used.)

On the other hand if the dot diameter is equal to the diagonal of the pixel grid, then nominally complete areal inking is usually attained by placing one quantum at each pixel, on-average. In this case it is this condition that will typically be established as "full coverage".

For dots intermediate in size between these two examples, other numbers of quanta intermediate between one-half and one will ordinarily provide nominally complete removal of white space—and so ordinarily will be identified as "full coverage" or "100% coverage". (In most but not all cases, it will be possible to express the value as one quantum per addressed pixel.)

As seen from the foregoing, a close and complex relationship obtains between nominally complete areal inking and "full (100%) coverage". The two differ in subtle ways and again, for purposes of this document, to avoid ambiguity only the quanta-per-pixel count will be used as the measure of "full coverage" or "100% area fill", etc.

Those of ordinary skill in this field will understand that various other factors affect the number of quanta which provide nominal white-space elimination—and so come to be identified with "full coverage". For example where system design establishes nonsymmetrical pixels, then a very great variety of relationships with colorant quanta can arise; it would not be helpful to understanding of the present invention to try to predict here the directions which such relationships might take.

As another example, even within the practice of the present invention it is possible to employ "dumb dotting" to provide either the underlying ("conventional") basic partial coverage or the added discretionary dots, or both. In other words, two or more inkdrops or dots may be employed together as a colorant-quantum unit, for either binary or multilevel printing.

In such cases either the size of the quantum may be taken as plural colorant dots, or the quantum may be taken as a single dot and the number of quanta per unit considered to vary. In either event the number of quanta used as the "unit" for the underlying partial coverage need not be the same as the number used as the "unit" for the added discretionary dotting.

The apparatus further includes some means for printing the image including the region with the added further quanta. These means, for like reasons, will be denominated the "printing means".

The foregoing may represent a description or definition of the first aspect or facet of the invention in its broadest or most general form. Even as couched in these broad terms, however, it can be seen that this facet of the invention importantly advances the art.

In particular this aspect of the invention first breaks the earlier tacitly observed rule that two or more quanta are provided only after a first full set has one quantum—not coexisting with some pixels that still have zero. By departing from that conventional wisdom, the present invention offers a new mechanism for controlling image-quality robustness in general—and system designers can exploit this general mechanism for any advantageous purpose. In particular for present purposes it thereby enables a breakthrough in the control of banding.

Although the first major aspect of the invention thus significantly advances the art, nevertheless to optimize enjoyment of its benefits preferably the invention is practiced in conjunction with certain additional features or characteristics. In particular, preferably the adding means also include some means for establishing a ratio of number of added-colorant pixels to total number of addressed pixels; and also some means for setting the ratio to a value below one-half.

The examples discussed above showed that reduction of banding was accompanied by increase of grain or clumping in the image. This is a fundamental characteristic of the invention and should be confronted as a matter of tradeoff between the degree of banding that is acceptable and the degree of granularity that is acceptable.

In practice it is often possible to virtually eliminate banding with only minor amounts of graininess paid as a price. The results in this regard, however, vary markedly with the elements of individual images.

If this preference is observed, then the setting means include some means for setting the ratio to a value between 0.15 and 0.4 inclusive. In this case, the setting may be performed either automatically or by an operator, or partly by both.

Automatic setting of the ratio (or the automatic portion of setting the ratio if this task is shared with the operator) usually involves microprocessor operations in which—at system startup, or earlier in the case of an ASIC—a memory position is set aside for holding the ratio and is so designated. These preliminary steps are helpfully regarded as "establishing" the DD ratio.

Most commonly, but not at all necessarily, the memory position also is filled with a default value. This entry of a default DD-ratio value is automatically setting the ratio, but semantically is not necessarily the end of the matter.

For example the apparatus may then automatically canvass various environmental conditions, or characteristics of the image to be printed, or both environmental and image factors. Based on such collected information the apparatus may then proceed to develop a DD ratio and load it into the designated memory position—perhaps erasing a default value if one was previously entered—and this too is setting the ratio.

This step of setting the ratio may further encompass a manual selection of another value, and a loading of that value into the designated memory slot (whether or not a default value was entered earlier). This loading also is setting the ratio, and a merely alternative way of expressing this semantic conclusion is to call this last-mentioned loading "yet another form or component of setting the ratio". Presence of such a manual step, however, is entirely consistent with the fact that, as set forth above, the several other loadings of the DD-ratio memory position are setting the ratio.

The ideal setting, however, may be in part a matter of esthetic preference—and also may depend in a subtle way upon particular esthetic features of individual images. Therefore a still further preference is that the setting means include some means for accepting a human operator manual selection to trade off banding robustness against granularity.

If the manual-selection preference is instituted, then it is still further preferred that these accepting means include some means for expressly presenting to the operator some indicia of the tradeoff. For example, preferably the indicating means include a human-readable scale that indicates increasing banding robustness in one direction, and decreasing granularity in an opposite direction—or the equivalent.

By "equivalent" is meant some other wording that conveys the same concept. The indicia should communicate to the user in esthetic or intuitive terms what the nature of the tradeoff is.

Thus equivalents do encompass a scale marked, merely by way of example, as shown below.

better as to:

$$\text{clumping} <= | = | = | = | = | = | = > \text{striation}$$
$$0 \quad 1 \quad 2 \quad 3 \quad 4 \quad 5$$

Alternatively, "increasing banding robustness" might be expressed as "less banding" or "destreak"; while "decreasing granularity" could be called "less clumping" or "more blue noise", or "raise dot frequencies".

More-general terms, however, might not serve—since banding and granularity both impair "image quality" and even "smoothness". Also, indicating variation in only one of these two characteristics could be unsatisfactory since few users would willingly select "more banding" if the displayed alternative is "less banding".

Indications such as a scale labeled "noise" with "white" at one end and "blue" at the other at least may be neutral as to suggestion of overall image acceptability, and may thereby beneficially send the user to the instruction manual or help file. The same may be true of a scale marked "spatial frequency" with "low" at bottom and "high" at top.

Nevertheless such indicia are needlessly cryptic as to the presence and character of the tradeoff. It may be noted that setting the control to the extreme left end of the scale as shown above may be equivalent to simply turning off the feature of the present invention.

In preferred embodiments of its second major independent facet or aspect, the invention is a method for reducing band effects in incremental printing of an image. The method includes the step of printing a region of the image at less than full (100%) coverage.

It also includes the step of—in order to compensate for error in colorant placement—adding further colorant quanta to selected pixels already receiving colorant as part of the less-than-full coverage within the region. Thereby, within the region, the amount of colorant printed in some pixels is zero, in others is one colorant quantum, and in still others is two or more colorant quanta.

The definitions, permitted ranges and other understandings discussed above in relation to the first facet of the invention are generally applicable here too—and as well to other invention aspects discussed below.

The foregoing may represent a description or definition of the second aspect or facet of the invention in its broadest or most general form. Even as couched in these broad terms, however, it can be seen that this facet of the invention importantly advances the art.

In particular, this aspect of the invention is specifically directed to reduction of the class of banding effects that arise through error in colorant placement. It is first to attack this problem by use of the added-colorant technique.

Although the second major aspect of the invention thus significantly advances the art, nevertheless to optimize enjoyment of its benefits preferably the invention is practiced in conjunction with certain additional features or characteristics. In particular, if the invention is printing an area fill at less than double (200%) coverage, in another region of the image, then preferably the method also includes the step of adding—within that other region—further colorant to selected pixels already receiving colorant as part of the area fill.

Another preference, is that the method further include the step of at least approximately maintaining a particular ratio between the "still other pixels" and the pixels receiving colorant as part of the less-than-full coverage within the region.

In preferred embodiments of its third major independent facet or aspect, the invention is a method of adding colorant in a region to which colorant is already addressed, in incremental printing of an image. The method includes the step of automatically establishing a ratio of number of added-colorant pixels to total number of addressed pixels.

It also includes the step of setting the ratio to a value below one-half. Furthermore it includes the step of automatically printing a region of the image with the added-colorant pixels included at that ratio.

The foregoing may represent a description or definition of the third aspect or facet of the invention in its broadest or most general form. Even as couched in these broad terms, however, it can be seen that this facet of the invention importantly advances the art.

In particular, this aspect of the invention focuses upon an advantageous range for parallel growth of single and plural colorant quanta within a common tonal-gradation sequence—advantageous because it is low enough to avoid objectionable clumping or graininess of added dots. Thus the third facet of the invention in principle can start from essentially zero inking and proceed through full dot addressing.

Although the third major aspect of the invention thus significantly advances the art, nevertheless to optimize enjoyment of its benefits preferably the invention is practiced in conjunction with certain additional features or characteristics. In particular, preferably the setting step includes setting the ratio to a value between 0.15 and 0.4, inclusive—an optimum range, high enough to be effective but well distanced from the onset of graininess at or above roughly the 50% point.

Another preference is that the setting step include a human operator selection to trade off banding robustness against granularity. Other preferences in regard to the third main facet of the invention relate to express indications—discussed above for the first aspect of the invention—of increasing banding robustness vs. decreasing granularity, on a scale for operator reference in manually selecting a setting.

In preferred embodiments of its fourth major independent facet or aspect, the invention is a method of adding colorant in a region to which colorant is already addressed, in incremental printing of an image. The method includes the step of automatically adding colorant by selectively employing a superpixel that is very insensitive to characteristics of dot placement error. It also includes the step of automatically printing a region of the image with that added colorant.

The foregoing may represent a description or definition of the fourth aspect or facet of the invention in its broadest or most general form. Even as couched in these broad terms, however, it can be seen that this facet of the invention importantly advances the art.

In particular, this aspect of the invention is a particularly sophisticated and powerful antiartifact technique. Making selective use of output data structures that are consistent in their visual properties, even in the presence of strongly varying placement error, is unusually effective.

Although the fourth major aspect of the invention thus significantly advances the art, nevertheless to optimize enjoyment of its benefits preferably the invention is practiced in conjunction with certain additional features or characteristics. In particular, preferably the superpixel is intermediate in characteristics between $$\begin{matrix} 1 & 0 \\ 0 & 1 \end{matrix} \text{ and } \begin{matrix} 2 & 0 \\ 0 & 0 \end{matrix},$$

or in abbreviated notation, explained in the detailed description that follows, [1 0; 0 1] and [2 0; 0 0]. Another preference is that the superpixel be selected from the group consisting of [2 0; 0 2], [1 0; 1 0], [1 1; 0 0], [0 0; 1 1], [0 1; 0 1].

In preferred embodiments of its fifth major independent facet or aspect, the invention is a method of incremental printing of an image by construction from individual colorant quanta addressed to pixels of a printing grid. The method includes the steps of automatically addressing a first number of colorant quanta to some pixels; and automatically addressing a second number of colorant quanta to other pixels—the second number being larger than the first.

These two steps are both performed for substantially all tonal levels in a range extending at least from highlight regions to midtones. Another step is automatically printing a region of the image with the added colorant.

The foregoing may represent a description or definition of the fifth aspect or facet of the invention in its broadest or most general form. Even as couched in these broad terms, however, it can be seen that this facet of the invention importantly advances the art.

In particular, by concurrently maintaining parallel different magnitudes of colorant over such a high range of tonal levels, this aspect of the invention conveys an unprecedented freedom from image-quality artifacts.

Although the fifth major aspect of the invention thus significantly advances the art, nevertheless to optimize enjoyment of its benefits preferably the invention is practiced in conjunction with certain additional features or characteristics. In particular, preferably the range extends at least from ten percent area fill through forty percent area fill. Also preferably the "other" pixels are selected from among the "some" pixels substantially at random.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a pair of enlarged conceptual diagrammatic views of a few pixels in a pixel grid, showing the effects of dot placement error (DPE) in a prior-art environment;

FIG. 2 is a graph showing how the number of pixels receiving plural dots grows with increasing tone level in a simple prior-art system, characterized in the present document as "dumb double dotting" (DDD)—in which all pixels receiving any dots at all receive a fixed plural number of dots;

FIG. 3 is a like graph showing the growth of numbers of pixels receiving either one dot or two dots, with increasing tone level, on a two-drop printing medium in the prior art;

FIG. 4 is a like prior-art graph but for a three-drop printing medium;

FIG. 5 is an enlarged pixel view like FIG. 1 but according to preferred embodiments of the invention, i. e. so-called "discretionary dotting" (DD);

FIG. 6 is a pixel-growth graph for a two-drop print medium—like FIG. 3, but according to preferred embodiments of the invention;

FIG. 7 is a like graph but for a three-drop medium, for comparison with FIG. 4 but also according to preferred embodiments;

FIG. 8 is a pair of enlarged views generally similar to FIG. 1 but showing overlap ratios for two extreme cases of adjacent dot placement, for discussion of sensitivity to dot placement error and DD fraction;

FIG. 9 is a highly conceptual graph showing the tradeoff effects of banding vs. grain with increasing DD;

FIG. 10 is a conceptual diagram showing basic bit management for implementing the FIG. 6 or 7 strategy;

DETAILED DESCRIPTION OF THE PREFERRED EMBODIMENTS

1. Concurrent Plural-Drop Development

Figure 11:
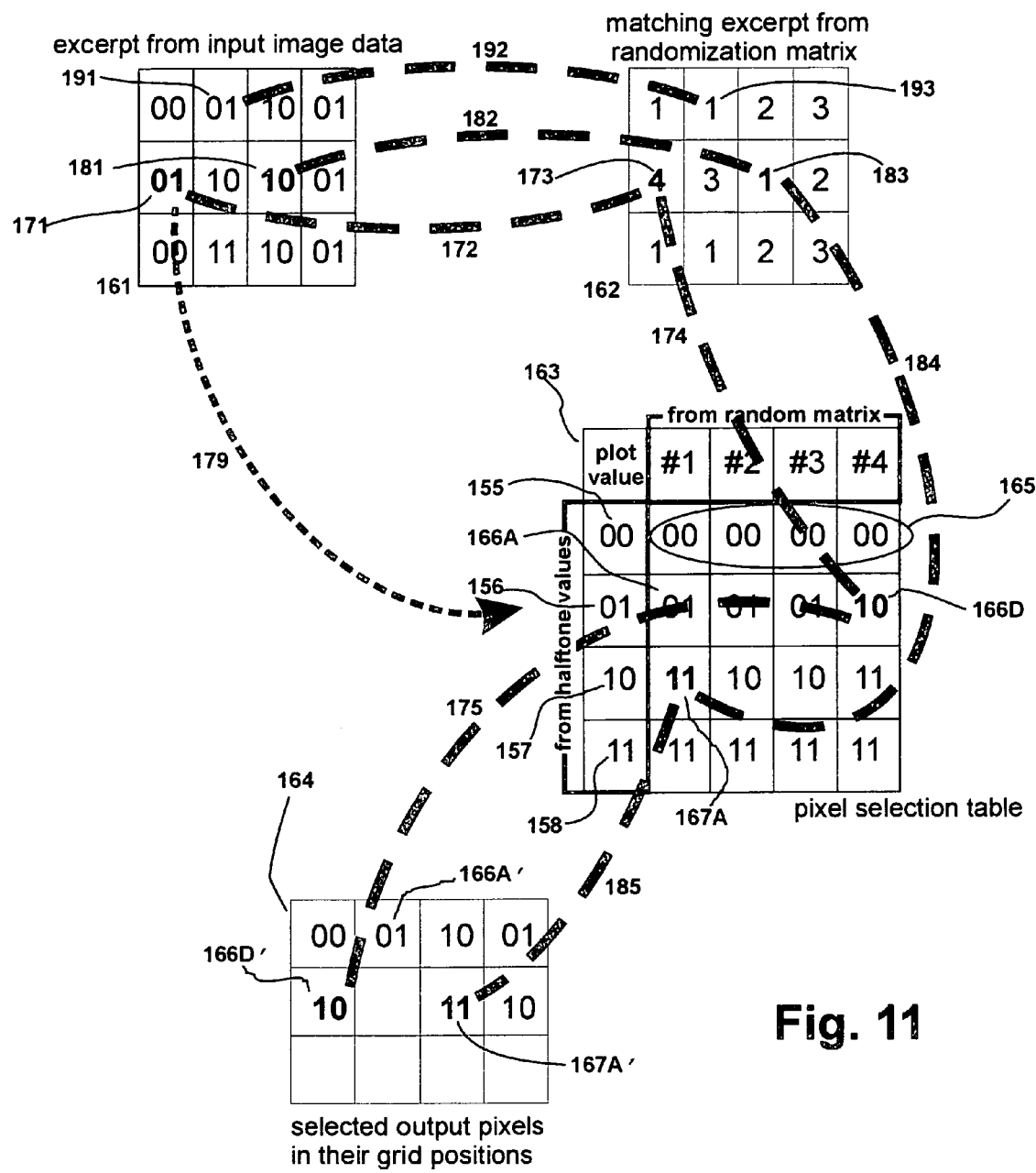
FIG. 11 is a like diagram following the results of the FIG. 10 bit management through the remainder of the implementation.

Another way to recognize the principles and practice of the invention, as introduced in the above summary section, is to see that the prior-art graphs of FIGS. 2 through 4 are no longer applicable. It is no longer true that two-drop pixel growth 127 (FIGS. 3 and 4) cannot begin until single-drop growth 125 has topped out and the system thereby reached an intermediate breakpoint 124.

Instead the number 136 (FIG. 6) of single-drop pixels and the number 137 of double-drop pixels both begin from the very smallest fractions of fill and the very finest saturations, at the origin 121. The total number of addressed pixels is the sum of the one-drop pixels 136 and two-drop pixels 137.

In preferred embodiments the two-drop pixel count 137 is some fraction—preferably a fixed fraction—of the single-drop count 136. The value of this fraction determines the banding/graininess tradeoff mentioned earlier, and may be set either automatically by the system in response to known image characteristics militating one way or the other, or manually by the operator based on human esthetic evaluation—or by a combination of both.

Analogously it is no longer true that three-drop growth 133 (FIG. 4) cannot begin until after two-drop pixel growth has topped out and the system thereby reached a second breakpoint 131. Instead the number of triple-drop pixels 142 (FIG. 7) grows, from the outset, in a relationship (preferably a fixed proportion) to the number of single-drop and double-drop pixels 136, 137.

In a word, according to the invention the development of plural-drop pixels 137, 142 is concurrent with that of single-drop pixels 136. The invention posits the coexistence of some pixels with one drop, others with two, and potentially others with three or more drops.

Again, the objective is greater robustness to banding than attainable through conventional orderly multilevel printing. The invention may be described as "discretionary dotting" (DD)—by contrast with the inflexible prior-art rule of "dumb double dotting" described earlier.

Within the category of DD, a relatively simple case is "double dotting" (as distinguished from "dumb double dotting"). In double dotting, some number of dots that make up the conventional dots is boosted up to double that number.

It is just one form of discretionary dotting, since multipliers other than two are entirely possible and within the scope of the invention. For example, if the conventional dots occur always in pairs (dumb double dotting)—two dots within a respective single pixel—the present invention can be used to add one discretionary dot to the statistically selected pixels.

Conversely if conventional dots occur always individually in respective single pixels, the present invention in principle can be used to add pairs or even triplets, etc. (Granularity due to such technique may be disadvantageous in many cases, but the method remains within the scope of the appended claims.)

2. The "DD Ratio" and its Implications

Thus the previously mentioned fraction of backup colorant quanta per pixel, the DD ratio, may be employed in describing double dotting—but with great care, as the term "DD ratio" may also be used for cases in which the DD multiplier is not two. As will be clear, a like ratio may be defined if desired for triple dotting.

As an example, a DD ratio of 0.33—in other words 33% DD—simply means that one out of every three pixels which will be printed at all will receive some number of drops greater than the conventional number. For instance that might be a total of two drops, or one and a half drops on-average, rather than one. Eventually if the pixels in the grid are all addressed by such a scheme, then continuing the same two examples the number of colorant quanta on the printing medium will be:

$$100\% + 1 \times 33\% = 133\%, \text{ or}$$

$$100\% + 1\frac{1}{2} \times 33\% = 150\%,$$

relative to the number of colorant quanta in a conventional printing system.

If desired, however, when the multiplier is one the application of colorant may continue beyond the 133%-dotted point, to a double-density or 200% area fill (i. e., by definition in this document an area fill that is 200% dotted) or higher—continuing, for example, on to a triple-density, 300%, fill (i.e. a fill that is by definition 300% dotted). The discussion and diagrams already presented should make clear, to a person of ordinary skill in this field, what to do to implement these goals, provided only that the printing system is capable of rendering and delivering the greater number of dots desired.

Certain DD ratios can be recognized as not discretionary dotting at all, but rather as prior-art systems. Thus 0% DD corresponds to the conventional orderly multilevel printing, and 100% DD corresponds to dumb double dotting—since every printed pixel has two drops, for any area fill percentage).

In practice, banding decreases as the DD ratio moves up to 0.5. In most cases, it disappears altogether before reaching that point.

The range from DD 0.5 to 1.0 has not been characterized as it does not, to-date, appear practically useful. As noted above, granularity increases with the DD ratio; hence minimum grain is achieved with the orderly multilevel printing. It is desirable to select a DD ratio low enough to avoid exaggerated granularity, but high enough to reduce or even remove banding.

The relationship between banding improvement and graininess (FIG. 9) has an optimum DD ratio value, generally between DD 0 and 0.5—but the exact value that is optimum and the actual shape of the curve vary with image characteristics as well as system characteristics. Hence the selection of an operating point within the usually optimum range may be best reserved for run time.

Pixels with various numbers of drops are advantageously distributed in the pixel grid under control of a matrix that controls which pixels in an area fill receive double or triple etc. dotting. The function that manages this distribution of varied numbers of drops may be termed a "bidimensional noise function".

This noise-function matrix will interact with the noise of halftoning algorithms—for instance an error-diffusion process. Therefore the bidimensional noise function is advisably coordinated with—or ideally integrated into—rendering and printmasking.

In other words, in principle both pixel-content control and noise spatial-frequency-content control can be accomplished by using the rendition or printmasking systems that are native to the printer, if those systems are adequately sophisticated. In this regard the earlier-mentioned patent document of Lain et al. teaches a superpixel system that performs these tasks.

3. Superpixel Families, and Optimizing Robustness

A preferred embodiment of the present invention operates in a specialized environment that is detailed in the above-mentioned Lain document. In that environment, rendition (preferably ED) is performed on a 12 dot/mm (300 dpi) pixel grid.

Then the results are applied to select one superpixel from a family of two-by-two, 24 dot/mm superpixels. The rendered image is then printed using a printing device that operates at 24 dot/mm resolution.

Each pixel at the 12 dot/mm resolution therefore is implemented as a two-by-two, 24 dot/mm superpixel. A natural way to implement the present invention therefore is to form two-by-two superpixels that most effectively invoke DD for antibanding robustness.

Generally speaking, the objective for discretionary dotting is to place within such a superpixel two dots instead of one—or three instead of two, or some given larger number instead of some given smaller number. The absolute number of dots, however, can be ignored for present purposes, and the question reduced simply to how best to add a dot.

A first observation here is that there are two extreme cases that nicely define the range of possibilities. For discussion arbitrarily suppose that a dot 151 (FIG. 8, both views) is placed in a superpixel 150 in its top left quadrant—pixel TL—i.e. in position (1,0); and then that its backup is either:

(1) discretionary dot 152 in the diagonally opposite quadrant of the superpixel, i.e. bottom right pixel BR at position (0,1), as in the upper view; or (2) discretionary dot 153 directly superimposed on the first-mentioned dot, i.e. at position (1,0), as in the lower view.

The first of these choices distributes the inking on the printing medium as evenly as possible. Only the small football-shaped areas are inherently double inked; even the remaining small fractions of the top-right and bottomleft pixels TR, BL are wholly inked by other superpixels.

From simple geometrical relationships in the drawing, these double-inked areas in the aggregate amount to less than three-fifths of the total inked area, i.e. of the entire four-small-pixel superpixel. (This fraction is a very different parameter from the DD ratio mentioned earlier—and also further discussed below.)

This superpixel is [1 0; 0 1], which is an in-text representation of—

$$\begin{matrix} 1 & 0 \\ 0 & 1 \end{matrix}$$

—in other words having dots in upper left and bottom right. The in-text notation presents first the top line of the two-by-two array, and then the bottom line.

This first, diagonal-geometry choice minimizes blank space. It also minimizes the mutual overlap of the two dots.

The second, superposition-geometry choice does the opposite—clumping the inking as much as possible by placing one dot on top of the other, maximizing blank space and also maximizing the overlap: all of the inked area is double inked. This superpixel 150' is [2 0; 0 0], in other words having two dots in top-left quadrant TL, leaving each of the other three quadrants TR, BL, BR to be only partially inked from adjacent superpixels.

The L* value is distinctly different for these two cases, being higher for the superposition geometry because it presents some white area that makes it more luminous. Of far greater interest is what happens when these idealized patterns are disrupted by DPE, for the objective of this analysis is to find the most useful way to place a discretionary dot—for robustness in the face of DPE.

As the diagonal geometry already has the smallest possible L* for a two-drop superpixel, its mean luminance can only increase with onset of DPE. Conversely, since the superposition geometry already has the largest possible L* for a two-drop superpixel, its mean luminance can only decrease with DPE.

A third member 150" (FIG. 8A) in the two-drop superpixel family can also be considered: [1 0; 1 0], or in other words with dots 154, 154' vertically adjacent, at upper left and lower left in the superpixel. Of course the relative space-filling properties of this vertical geometry are the same as for its three rotational cousins [1 1; 0 0], with both dots horizontally adjacent in the top of the superpixel; [0 1; 0 1], with both dots vertically adjacent at the right side; and [0 0; 1 1], with both dots horizontally adjacent at the bottom.

This adjacency geometry, with its dot centers closer together, presents more overlap than the diagonal case but of course less than the superposition case. Hence either increase or decrease of L* is possible with rising DPE, depending on the character of the misplacement.

Because L* will rise in some instances and fall in others, the mean L* for the adjacency geometry is less sensitive to variations in DPE than either of the other two geometries. This intermediate geometry is thus most robust to DPE variation, and accordingly is preferred.

Although the embodiments which are now preferred use two-dot superpixels, the invention—and the broad preference just described—are more general than the foregoing discussion of two-dot superpixel families. A like preference for intermediate L* behaviors will be observed generally for any n-dot family: typically a couple of superpixels will have the minimum and maximum L*, and all others will be somewhere between.

Without belaboring what will now be evident, those intermediate geometries are the least sensitive to variant DPE characteristics and therefore are the most robust in response to DPE. Actual values of sensitivity to DPE have been calculated by simulation and to a lesser extent measured by empirical observation, but again the conclusions from these efforts are of greater value and are readily summarized:

Discretionary-dotted pixels show a trend toward decreasing luminosity, whereas single-dotted pixels tend to increase it—and to do so in a more sensitive way. Thus having a few discretionary-dotted pixels balances the upward trend of single-dotted pixels.

The least-sensitive two-by-two superpixel interestingly appears to be [2 0; 0 2], with two dots placed in each of two diagonally opposed corners. This geometry 150''' (FIG. 8B) combines the two earlier-described extreme geometries (diagonal and superposed), which accordingly strongly complement one another.

4. Pixel Management and Spatial Frequency

To implement a design DD ratio, finished binary tonal levels 155–158 (FIG. 10) from a rendering process (such as ED) are made to serve as pointers to nominally related pixel groups 165–168, respectively—which will here be called pixel "families". The illustration corresponds to an actually implemented exemplary system that both renders and prints at 24 dot/mm. The families have "members" that are numbered down the left-hand edge of the diagram.

Some of the tonal levels 155, 158 may be (this is not a requirement) most naturally interpreted as identities in the respective families, e.g. for zero inking and full inking respectively, as shown. Members of other families advantageously diverge from the nominal values.

Such divergence is suggested for the binary levels "01" and "10" (i.e. decimal "1" and "2" respectively). In particular the input level 156, which has value "01", is a pointer 176 to a family 166 of pixels seen as including an equal number of "01" and "11" pixels and thereby assuming average tonal value of decimal 1½.

In this way the first step may be taken toward raising the printed output level relative to the input tonal level; however, as will shortly be seen the opportunities for control are more extensive and subtle than indicated so far. This first step appears also in the pointer usage of input level 157, which has tone value "10" but points to a family with equal numbers of members at "10" and "11", thus assuming average tonal value of decimal 2½.

A more complete picture of the mapping process, for an embodiment that both renders and prints at 24 dot/mm, requires consideration of four numerical arrays:

the input image or "plot" data 161 (FIG. 11), a randomization matrix 162, usually prepared as part of system design, a pixel selection table 163, and the selected output grid 164 with its selected pixels.

In each of these tables two values that will be of particular interest appear in boldface type.

The pixel selection table 163 is identical to the level/ family mapping of FIG. 10, but only in a more-compact showing: the tonal levels 155–158 appear in the left-hand column headed "plot value", and the families are in corresponding rows, arrayed in the remaining four columns to the right.

The family-member numbers "#1" through "#4" appear as headings for those columns. Some differences, however, will be seen in the specific numbers in the table 163 vs. the previous drawing (FIG. 10).

Entry into the pixel selection table 163 is from two directions at once: rows are selected by the input-data tones, read 179 directly from the input data values; while columns are selected by values from the randomization matrix 162. Values from that matrix 162 in turn are mapped from the input-data grid locations.

The family 166A . . . 166D appearing with tonal level 156 (value "01") here has three entries of "01", and just one entry 166D of "10" (in boldface), in the far righthand column—column "#4". Hence the average output tonal value might be supposed to be 1¼.

The actual output tone, however, is not determined thus but rather by controlling the relative number of occurrences of the entries in the several columns. In other words, control is exerted by defining the number of times that each pixel will be selected, in operation of the system.

That control of relative incidence is expressly the function of the randomization matrix 162. Thus for example the entry 166D in column #4 will be selected whenever the numeral "4" (seen in boldface) is cued 174 into the pixel selection table from—for instance—the position 173 in the first column, second row of that matrix.

Tracing the control further upstream 172: as stated above, the operative position 173 in the randomization matrix 162 is called by the grid location 171 in the image data 161. The entry there, "01" (also shown in boldface), as will be recalled serves 179 as the row selector into the pixel selection table 163.

For the example under consideration, it remains to follow the pixel selection table causal links downstream. Once the pixel "10" at 166D is thus identified, that particular unit is transferred 175 to the output grid 164—which now has a corresponding entry 166D' in the same relative position as the originating pixel 171 in the input data.

The image-data location, in other words, is used twice: once mapping into the randomization matrix 162, and then again receiving the designated pixel 166D into the output pixel grid 164. The example traced so far is perhaps of particular interest in that:

the value "10" at 166D in the selection table 163 appears only once in its family, and the value "4" that calls it—at 173 in the randomization matrix 162—appears only once in that entire matrix.

Hence the example chosen to begin this tutorial exercise represents a very fine adjustment in the overall behavior of the pixel selection system, as an implementation of the present invention. The binary input tone "01", for the particular numbers used, is raised to a binary output tone "10"—i.e. from decimal "1" to "2".

A much less unusual sequence of entries can be followed, but this time starting with the beginning of the process from the boldface input-data point 181, of value "10", across 182 to a boldface entry 183 (value "1") in the randomization matrix 162, and thence down 184 to a boldface entry 167A (value "11") in the pixel selection table 163, and finally a down to a boldface entry 167A' (value "11") in the output grid 164.

Here the input-data point 181 (value "10") also points to the family "10" (third row in the body of the pixel selection table). To avoid further clutter of the drawing, this particular causal path is not marked.

In the randomization matrix 162, there are five entries (out of twelve total) with value "1"—i.e. the same as the example just traced. In the pixel selection table 163, for family "10" there are two entries (out of five total).

Therefore this example represents an instance of relatively broad-brush control such as establishes a main numerical trend of the system. Specifically the result for the exemplary numbers used is that the binary input tone "10" is raised to an output tone "11", i.e. from decimal "2" to "3".

Yet another kind of control begins in the image-data grid 161 with a pixel position 191 (tone level "01"), proceeding across 192 to an entry 193 of value "1" in the randomization matrix. Again to avoid adding to the complexity of the drawing, the remaining links have not been marked—but it will be understood that the randomization value "1" will call column #1 in the pixel table 163, while the tonal value "01" calls family row "01" in that table 163.

The pixel at the intersection of this column and row is 166A, with value "01"—and this value is transferred to the output grid at position 166A'. The output value for position 166A' remains "01", the same as the input value for the same pixel position 191. This case thus produces no value change at all.

In short, the fraction of discretionary dotting is determined by the randomization matrix, and any ratio between zero and unity can be achieved—not only zero or unity as in the prior art. One representative specific implementation was developed as follows.

A Shakes printmask was designed for a twelve-pass printmode. This mask was 256×256, and contained values from "1" to "12", each appearing $\frac{1}{12}$=8.33% of the time.

Original values "1" through "4" were left undisturbed, but all occurrences of "5" were replaced by "2", and all instances of "6" and "7" by 3. The rest of the numbers (i.e. "8" through "12") were replaced by "4".

In the resulting randomization matrix, "1" appears 8.33% of the time, "2" appears 16.67% of the time, "3" appears 25% of the time, and "4" the remaining 50% of the time.

Out of the four members of the family, any member may be chosen to have a discretionary dot. If member "1" is so chosen, then (since "1" appears only once in twelve entries on-average) the system should produce 8.33% discretionary dotting—i.e. a DD ratio of $\frac{1}{12}$ or 8.33%. If member #4 has the double dot, then discretionary dotting should occur half the time, DD $\frac{1}{2}$.

The specific implementation under discussion assigned discretionary dotting to members "2" and "3" of the pixel family, corresponding to discretionary dotting of 16.67%+25%=41.67%.

Thus a readily achieved ratio when averaging a 256×256 pixel area is roughly DD 42%, near the optimum range. In round numbers, roughly two out of every five dots are doubled.

Not all banding is equal, and banding need not be removed completely to produce major improvement in image appearance. These truths may be particularly clear from considering banding in the frequency domain.

Figure 12:
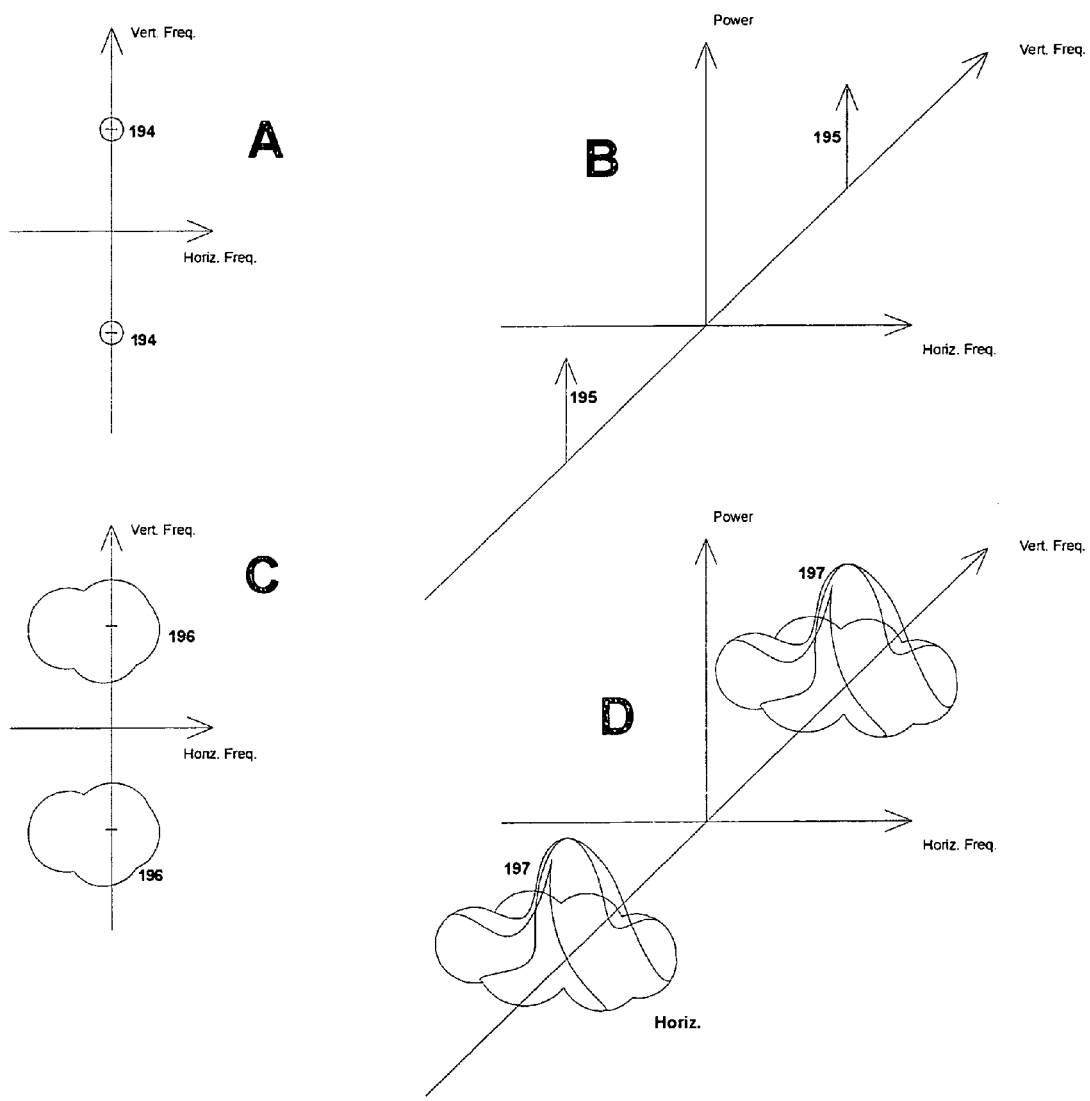
FIG. 12 is a group of diagrams that illustrate, in the spatial-frequency domain, how preferred embodiments affect banding—the upper two sketches being respectively plan and isometric views of prior-art banding, and the lower two being like views of potentially the same banding but after mitigation by the present invention.

Suppose "horizontal" (FIG. 12, view A) is defined as an axis of spatial frequencies localized in an incremental-printing scan direction (usually the transverse, right-to-left direction of a piece of printing medium); and "vertical" is defined as an axis of spatial frequencies localized in the printing-medium advance direction (usually the longitudinal direction). A third axis, "power" is orthogonal to both the horizontal and vertical axes.

Two arrows 194 appear going into the plane of the paper in view A—which is looking upward into the vertical-horizontal plane. Two arrows 195 appear upstanding in the power-vertical plane in view B (isometric).

Actually the arrows 194 and 195 both represent the identical quantity, namely power in banding as a function of spatial frequency—for conventional light/white-line banding. As usual these graphs are symmetrical.

The illustrated frequency localization of banding is very sharp. It is a clean, not grainy banding and appears very distinctively.

This may be the kind of banding that is seen when everything in an image is sharply-tuned, and the banding appears very distinctively. Unfortunately this is the most natural character for banding as ordinarily generated by weak or misaimed printing elements (e.g. nozzles).

Such high-Q banding, like a high-Q signal of any type, is generally most sensitively detected and perceived. For present purposes this is undesirable.

The two lower figures represent the same banding, but at low Q. The energy 196 seen in the vertical-horizontal plane of view C—again, the same energy 197 seen in the isometric view D that more clearly exhibits the power axis—has been somewhat spread away from the central frequency point, and each sharp impulse function has become blunted and diffused.

This is precisely the result that may be expected from applying the techniques of the present invention. That is to say, the banding is not truly eradicated but rather is obscured and confused, muddled in the field of randomly scattered discretionary dots 115 (FIG. 5). In short, the banding is still there but more blurred so that it is much less conspicuous—and in some cases perhaps invisible to the eye.

5. Mechanical and Program/Method Features

The invention is amenable to implementation in a great variety of products. It can be embodied in a printer/plotter that includes a main case 1 (FIG. 13) with a window 2, and a left-hand pod 3 which encloses one end of the chassis. Within that enclosure are carriage-support and -drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 211 and controls 212 are mounted in the skin of the right-hand pod 213. That pod encloses the right end of the carriage mechanics and of the medium advance mechanism, and also a printhead cleaning station. Near the bottom of the right-hand pod for readiest access is a standby switch 214.

Within the case 1 and pods 3, 213 a cylindrical platen 241 (FIG. 15)—driven by a motor 242, worm and worm gear (not shown) under control of signals from a digital electronic processor 71—rotates to drive sheets or lengths of printing medium 4A in a medium-advance direction. Print medium 4A is thereby drawn out of the print-medium roll cover 4.

Meanwhile a pen-holding carriage assembly 220 (FIGS. 14 and 15) carries several pens 223–226 (FIG. 14) back and forth across the printing medium, along a scanning track—perpendicular to the medium-advance direction—while the pens eject ink. For simplicity's sake, only four pens are illustrated; however, as is well known a printer may have six pens or more, to hold different colors—or different dilutions of the same colors as in the more-typical four pens. The medium 4A thus receives inkdrops for formation of a desired image, and is ejected into the print-medium bin 5.

A very finely graduated encoder strip 233, 236 (FIG. 15) is extended taut along the scanning path of the carriage assembly 220 and read by another, very small automatic optoelectronic sensor 237 to provide position and speed information 237B for the microprocessor. One advantageous location for the encoder strip is shown in several of the earlier cross-referenced patent documents at 236, immediately behind the pens.

A currently preferred position for the encoder strip 33 (FIG. 14), however, is near the rear of the pen-carriage tray—remote from the space into which a user's hands are inserted for servicing of the pen refill cartridges. For either position, the sensor 237 is disposed with its optical beam passing through orifices or transparent portions of a scale formed in the strip.

The pen-carriage assembly 220, 220' (FIG. 15) is driven in reciprocation by a motor 231—along dual support and guide rails 232, 234—through the intermediary of a drive belt 235. The motor 231 is under the control of signals from digital processors 71.

Naturally the pen-carriage assembly includes a forward bay structure 222 for pens—preferably at least four pens 223–226 holding ink of four different colors respectively. Most typically the inks are yellow in the leftmost pen 223, then cyan 224, magenta 225 and black 226. As a practical matter, chromatic-color and black pens may be in a single printer, either in a common carriage or plural carriages.

Figure 13:
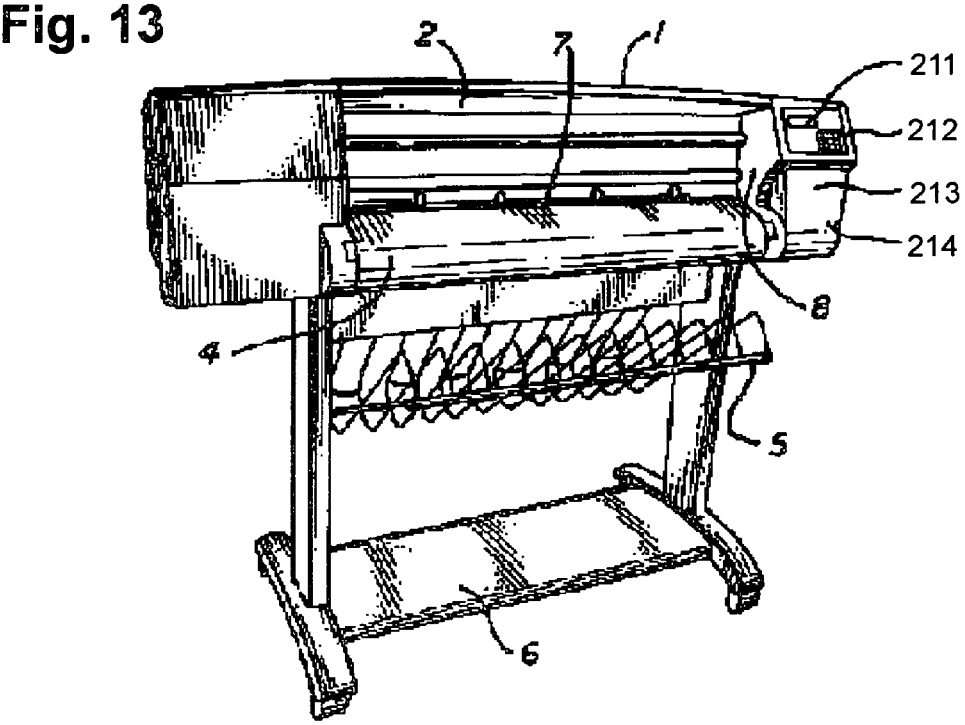
FIG. 13 is a perspective view of the exterior of a printing device embodying preferred embodiments of the invention.
Figure 14:
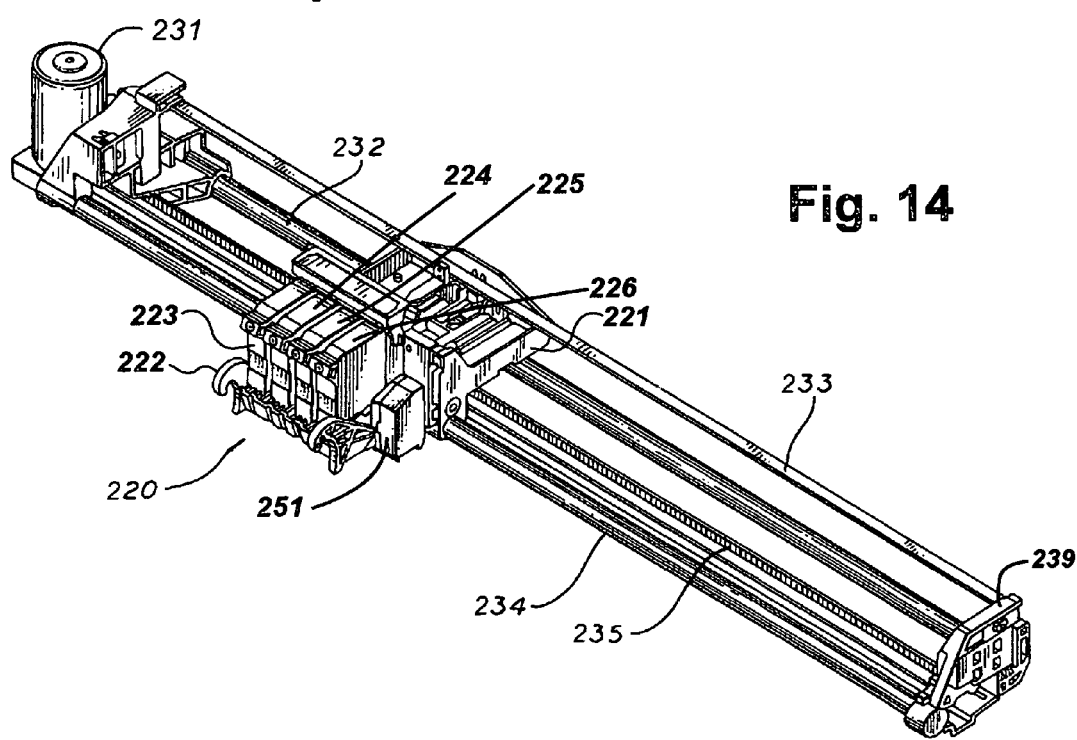
FIG. 14 is a like view of a scanning carriage and medium-advance mechanism in the FIG. 13 device.

Also included in the pen-carriage assembly 220, 220' is a rear tray 221 carrying various electronics. FIGS. 13 and 14 most specifically represent a system such as the Hewlett Packard printer/plotter model "DesignJet 2000CP", which does not include the present invention. These drawings, however, also illustrate certain embodiments of the invention, and—with certain detailed differences mentioned below—a printer/plotter that includes preferred embodiments of the invention.

Figure 15:
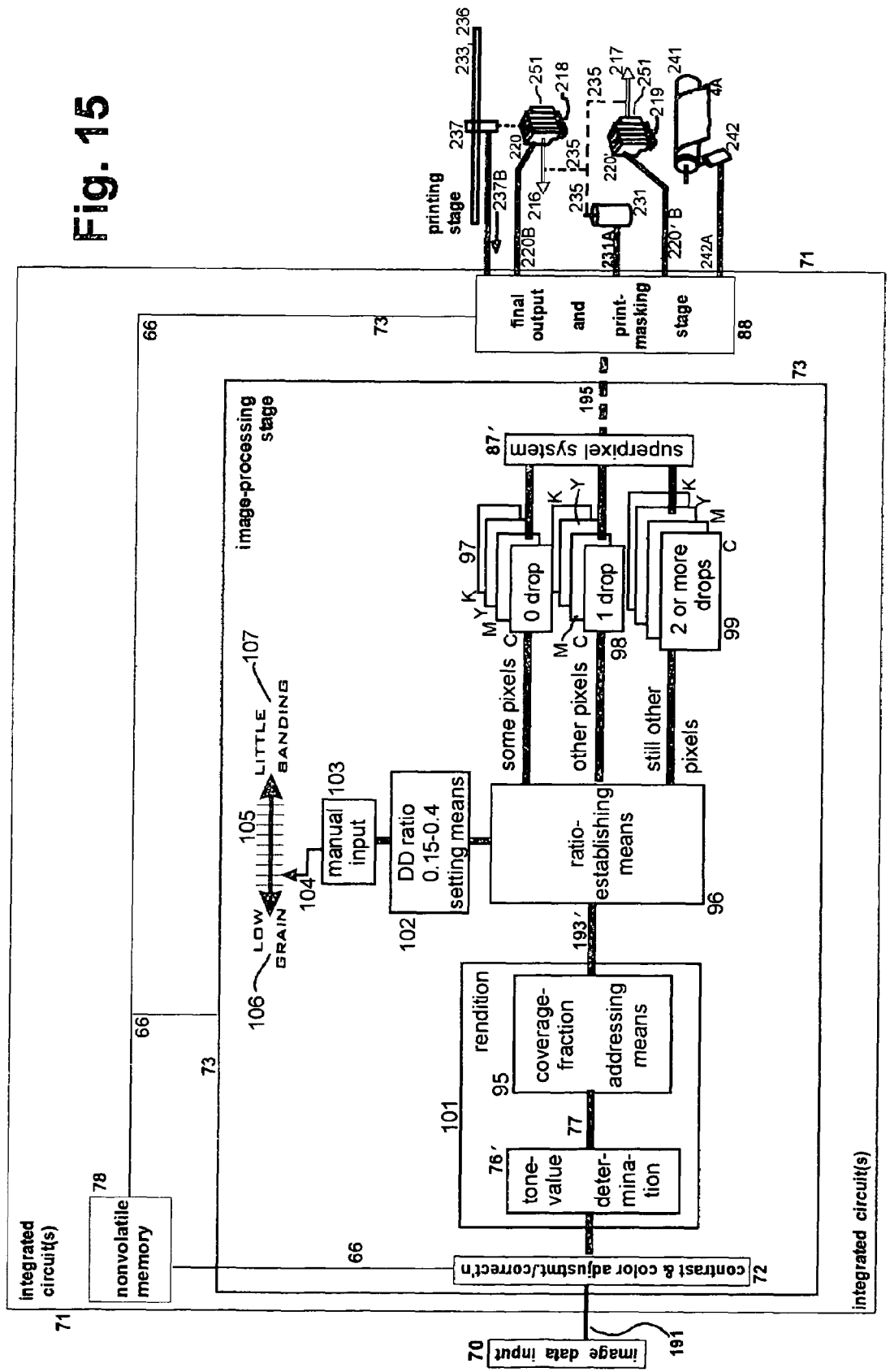
FIG. 15 is a highly schematic diagram of the working system of the FIGS. 13 and 14 device, particularly as used to practice preferred embodiments of the third above-introduced aspect of the invention.

Before further discussion of details in the block diagrammatic showing of FIG. 15, a general orientation to that drawing may be helpful. This diagram particularly represents preferred embodiments of the previously discussed apparatus aspect of the invention.

Conventional portions of the apparatus appear as elements 70, 72, 76', 78 and 101 at the left end of FIG. 15, and also the printing stage 220, 220', 241, 242, 237. Also generally conventional are related signals 66, 237B, 220B, 220'B, 231A, 242A, and the associated output/printmask stage 88 at the far right end of the diagram.

Features particularly related to the apparatus aspect of the invention appear in the central region as elements 96 through 99, 87', and 102 through 107. Given the statements of function and the diagrams presented in this document, an experienced programmer of ordinary skill in this field can prepare suitable programs for operating all the circuits.

The pen-carriage assembly is represented separately at 220 when traveling to the left 216 while discharging ink 218, and at 220' when traveling to the right 217 while discharging ink 219. It will be understood that both 220 and 220' represent the same pen carriage.

The previously mentioned digital processor 71 provides control signals 220B, 220'B to fire the pens with correct timing, coordinated with platen drive control signals 242A to the platen motor 242, and carriage drive control signals 231A to the carriage drive motor 231. The processor 71 develops these carriage drive signals 231A based partly upon information about the carriage speed and position derived from the encoder signals 237B provided by the encoder 237.

(In the block diagram all illustrated signals are flowing from left to right except the information 237B fed back from the sensor—as indicated by the associated leftward arrow.) The codestrip 233, 236 thus enables formation of color inkdrops at ultrahigh precision during scanning of the carriage assembly 220 in each direction—i. e., either left to right (forward 220') or right to left (back 220).

New image data 70 are received 191 into an image-processing stage 73, which may conventionally include a contrast and color adjustment or correction module 72, and a rendition module 101. This module includes a block 76', preferably operating by error diffusion, to determine a tone value 77 (corresponding to the levels 155–158 in FIG. 10) to be printed at each pixel—and a further block 95 which in effect interprets the tone value 77 as a coverage fraction.

Although generally conventional in its internal operation, the rendition module 101 preferably operates at relatively low resolution e.g. 12 dots/mm, for the reasons and in the manner described in the above-mentioned Lain document. Complementary to this low-resolution rendering, that document also teaches use of a pixel system for implementing the low-resolution coverage fraction 193' as a choice of a higher-resolution pixel for printing. (In this document the earlier discussion of FIGS. 10 and 11 covers portions of the same ground.)

For present purposes, in FIG. 15 that entire pixel system appears simplified as a small block 87'. Interposed between the rendition module 101 and pixel system 87' are ratio-establishing means 96, which operate to establish the DD ratio discussed at some length above.

These ratio means 96 are preferably controlled by some means 102 for setting the DD ratio within the optimum range (FIG. 9), which representatively and preferably is 0.15 to 0.4. Although these means 102 are advantageously automatic, a manual override or fine-tuning block 103 is beneficially provided.

This manual-input unit 103 if present preferably includes a slider or a stepper switch 104. The stepper or slider may be implemented as an on-screen selector in a graphical user interface of a personal computer, or of course if preferred as an actual electromechanical slider or switch.

In either event the stepper or slider 104 preferably operates along a scale 105 accompanied by indicia 106, 107 to expressly present to the user the implication of trading-off granularity against banding. It will be understood that the system is entirely capable of operation with no manual-input provision 103–107 at all, if design philosophy undertakes to establish in the setting means 102 an ideal or acceptable ratio automatically.

Output from the ratio-establishing means 96, as conditioned by the setting means 102, is in effect a hierarchy 97–99 of pixels receiving different numbers of dots, e.g. inkdrops. Thus as shown some pixels will receive no drop 97, others one drop 98 and still others two or more drops 99.

Unlike prior-art systems, the invention enables coexistence of these three states on a printing medium simultaneously. As the drawing suggests, the entire operation of the image-processing system 73 is advantageously conducted with respect to the four or more colorants of a subtractive printing system.

Thus for instance the output hierarchy may include cyan C, magenta M, yellow Y and black K plural drops 99, together with CMYK single drops 98 and CMYK zero drop 97. Of course the specification of colorant for zero drop is somewhat a semantic point.

The invention is by no means limited to operation in four-colorant systems. To the contrary, for example sixcolorant "CMYKcm" systems including dilute cyan "c" and magenta "m" colorant are included in preferred embodiments. The hierarchy of states for each input tonal level 77 is then interpreted by the pixel system 87' to provide higher-resolution printing.

Integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e.g. the central processor of a general-purpose computer) operating software such as may be held for instance in a computer hard drive, or operating firmware (e.g. held in a ROM 70 and for distribution 66 to other components), or both; and may comprise application-specific integrated circuitry. Combinations of these may be used instead.

In operation the system retrieves 301 (FIG. 16) its operating program appropriately—i. e., by reading instructions from memory in case of a firmware or software implementation, or by simply operating dedicated hardware in case of an ASIC or like implementation. Once prepared in this way, the method proceeds to the procedure 301 through 314 as illustrated.

Analogously to the preferred hardware embodiment discussed above, the procedure begins with establishment 302 of the desired DD ratio, establishment 306 of a user interface (which may be either a computer GUI or actual mechanical controls). Next are real-time steps including generation or receipt 308 of image data, preparation 311 for printing including addition of further colorant 312; and finally printout 314 onto a printing medium.

Figure 16:
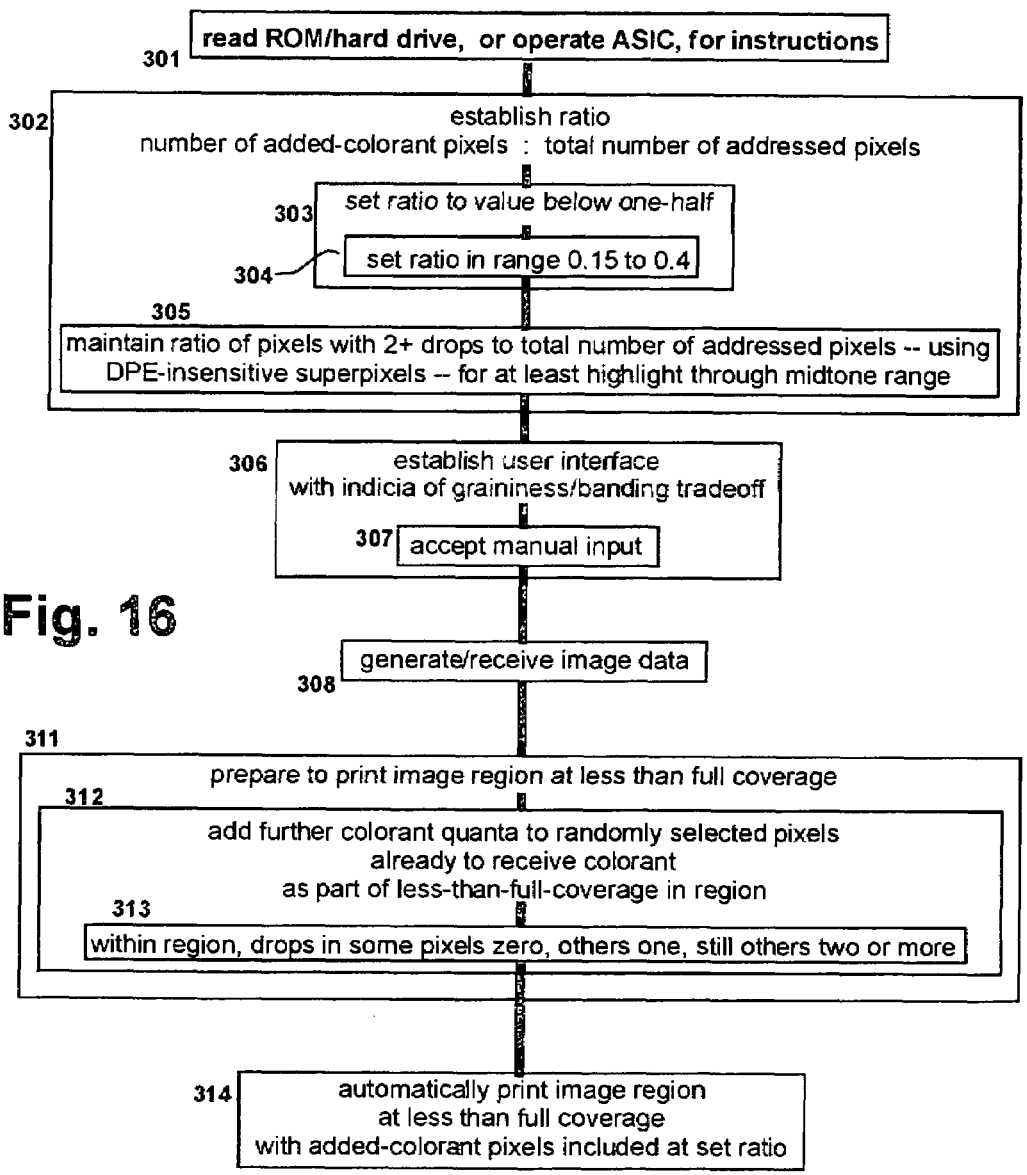
FIG. 16 is a flow chart showing operation of the FIGS. 13 and 14 device, particularly as used to practice the first, second and fourth aspects of the invention.

In view of the foregoing it is believed that the person skilled in this field will find the remaining details of FIG. 16 self explanatory.

The above disclosure is intended as merely exemplary, and not to limit the scope of the invention—which is to be determined by reference to the appended claims.

What is claimed is:

1. Apparatus for incremental printing of an image; said apparatus comprising:
    means for addressing a region of the image at less than full (100%) coverage;
    means for adding further colorant quanta to selected pixels already receiving said colorant as part of the less-than-full coverage within the region;
    whereby, within the region, the amount of the colorant printed in some pixels is zero, in others is a first nonzero number of colorant quanta, and in still others is a second nonzero number of colorant quanta;
    wherein the second nonzero number is different from the first nonzero number; and
    means for printing the image including the region with the added further quanta.

2. The apparatus of claim 1, wherein the adding means further comprise:
    means for establishing a ratio of number of added-colorant pixels to total number of addressed pixels; and
    means for setting the ratio to a value below one-half.

3. The apparatus of claim 2, wherein:
    the setting means comprise means for setting the ratio to a value between 0.15 and 0.4 inclusive.

4. The apparatus of claim 3, wherein:
    the setting means comprise means for accepting a human operator manual selection to trade off banding robustness against granularity.

5. The apparatus of claim 4, wherein:
    the accepting means comprise means for expressly presenting to the operator some indicia of the tradeoff.

6. The apparatus of claim 5, wherein the indicating means comprise a human-readable scale that indicates:
    increasing banding robustness in one direction, and
    decreasing granularity in an opposite direction
    or equivalent.

7. A method for reducing band effects in incremental printing of an image; said method comprising the steps of:
    printing a region of the image at less than full (100%) coverage; and
    in order to compensate for colorant-placement error, adding further colorant quanta to selected pixels already receiving colorant as part of the less-than-full coverage within the region;

whereby, within the region, the amount of colorant printed in some pixels is zero, in others is a first nonzero number of colorant quanta, and in still others is a second nonzero number of colorant quanta;

wherein the second nonzero number is different from the first nonzero number.

8. The method of claim 7, wherein:

said full coverage is approximately one colorant quantum per printer pixel, on-average.

9. The method of claim 8, wherein:

each colorant quantum forms in the printed image a roughly circular dot of diameter approximately equal to the length of a diagonal across a single printer pixel.

10. The method of claim 7, wherein:

said full coverage is approximately one-half colorant quantum per printer pixel, on-average.

11. The method of claim 10, wherein:

each colorant quantum forms in the printed image a roughly circular dot of diameter substantially equal to twice the height or twice the width of a single printer pixel.

12. The method of claim 11, wherein:

the setting step comprises a human operator selection to trade off banding robustness against granularity.

13. The method of claim 10, wherein:

the setting step comprises setting the ratio to a value between 0.15 and 0.4 inclusive.

14. The method of claim 10, wherein:

the setting step comprises a human operator selection on a scale that expressly indicates:

increasing banding robustness in one direction, and decreasing granularity in an opposite direction or equivalent.

15. The method of claim 7, wherein:

said full coverage is between one-half and one colorant quanta per printer pixel, on-average.

16. The method of claim 15, wherein:

each colorant quantum forms in the printed image a roughly circular dot of diameter between one-half and one times the height or between one-half and one times the width of a single printer pixel.

17. The method of claim 15, wherein:

the setting step comprises a human operator selection on a scale that expressly indicates:

increasing banding robustness in one direction, and decreasing granularity in an opposite direction, or equivalent.

18. The method of claim 7, further comprising the steps of:

in another region of the image, printing an area fill at less than double (200%) coverage; and within said other region, adding further colorant to selected pixels already receiving colorant as part of the area fill.

19. The method of claim 18, wherein:

said double coverage is approximately two colorant quanta per printer pixel, on-average.

20. The method of claim 19, wherein:

each colorant quantum forms in the printed image a roughly circular dot of diameter approximately equal to the length of a diagonal across a single printer pixel.

21. The method of claim 18, wherein:

said double coverage is approximately one colorant quanta per printer pixel, on-average.

22. The method of claim 21, wherein:

each colorant quantum forms in the printed image a roughly circular dot of diameter substantially equal to twice the height or twice the width of a single printer pixel.

23. The method of claim 18, wherein:

said double coverage is between one and two colorant quanta per printer pixel, on-average.

24. The method of claim 23, wherein:

each colorant quantum forms in the printed image a roughly circular dot of diameter between one and two times the height or between one and two times the width of a single printer pixel.

25. The method of claim 7, further comprising the step of:

at least approximately maintaining a particular ratio between said still other pixels and said pixels receiving colorant as part of the less-than-full coverage within the region.

26. A method of adding colorant in a region to which colorant is already addressed, in incremental printing of an image; said method comprising the steps of:

eliminating or reducing white-line or light-line banding in a region of the image; said eliminating or reducing step comprising the steps of:

automatically establishing a ratio of number of added-colorant pixels to total number of addressed pixels;

setting the ratio to a value below one-half; and automatically printing said region of the image with said added-colorant pixels included at said ratio.

\* \* \* \* \*

UNITED STATES PATENT AND TRADEMARK OFFICE
CERTIFICATE OF CORRECTION

PATENT NO. : 6,995,863 B1
APPLICATION NO. : 09/642417
DATED : February 7, 2006
INVENTOR(S) : Antoni Gil Miguel It is certified that error appears in the above-identified patent and that said Letters Patent is hereby corrected as shown below:

In column 4, line 28, delete "calorimetric" and insert -- colorimetric --, therefor.

In column 18, line 8, delete ""O1"" and insert -- "01" --, therefor.

In column 19, line 33, before "down" delete "a".

Signed and Sealed this

Second Day of June, 2009

JOHN DOLL
*Acting Director of the United States Patent and Trademark Office*